(12) United States Patent
Desai et al.

(10) Patent No.: US 8,711,499 B1
(45) Date of Patent: Apr. 29, 2014

(54) METHODS FOR MEASURING MEDIA PERFORMANCE ASSOCIATED WITH ADJACENT TRACK INTERFERENCE

(75) Inventors: Mrugesh Desai, San Jose, CA (US); Harold H. Gee, San Jose, CA (US); Mark A. Nichols, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 398 days.

(21) Appl. No.: 13/045,416

(22) Filed: Mar. 10, 2011

(51) Int. Cl.
G11B 27/36 (2006.01)

(52) U.S. Cl.
USPC .................... 360/31; 360/29; 360/53; 360/62

(58) Field of Classification Search
None
See application file for complete search history.

(56) References Cited

U.S. PATENT DOCUMENTS

| | | | |
|---|---|---|---|
| 5,600,500 A | 2/1997 | Madsen et al. | |
| 5,691,857 A | 11/1997 | Fitzpatrick et al. | |
| 6,877,116 B1 | 4/2005 | Kost et al. | |
| 6,909,566 B1 * | 6/2005 | Zaitsu et al. | 360/31 |
| 6,947,234 B2 * | 9/2005 | Lamberts et al. | 360/53 |
| 6,975,475 B2 | 12/2005 | Lee et al. | |
| 7,095,576 B2 | 8/2006 | Kim et al. | |
| 7,170,700 B1 * | 1/2007 | Lin et al. | 360/31 |
| 7,227,708 B2 * | 6/2007 | Feng | 360/31 |
| 7,567,397 B2 * | 7/2009 | Lu | 360/31 |
| 7,706,096 B2 * | 4/2010 | Ito et al. | 360/75 |
| 7,729,071 B2 * | 6/2010 | Harada | 360/39 |
| 7,747,907 B2 | 6/2010 | Olds et al. | |
| 7,768,729 B2 * | 8/2010 | Moser et al. | 360/31 |
| 7,982,989 B1 * | 7/2011 | Shi et al. | 360/31 |
| 8,102,613 B2 * | 1/2012 | Duan et al. | 360/31 |
| 8,125,723 B1 | 2/2012 | Nichols et al. | |
| 8,125,724 B1 | 2/2012 | Nichols et al. | |
| 8,331,053 B2 * | 12/2012 | Hobbet | 360/60 |
| 2003/0081338 A1 * | 5/2003 | Wang et al. | 360/66 |
| 2006/0066971 A1 * | 3/2006 | Alex et al. | 360/31 |
| 2008/0189469 A1 * | 8/2008 | Mettler et al. | 711/100 |
| 2008/0198492 A1 * | 8/2008 | Ahn | 360/31 |
| 2009/0310249 A1 * | 12/2009 | Michinaga | 360/77.02 |
| 2011/0075286 A1 | 3/2011 | Duan et al. | |
| 2011/0075290 A1 * | 3/2011 | Hobbet | 360/55 |

OTHER PUBLICATIONS

Alexander Taratorin, "Characterization of Magnetic Recording Systems: A practical Approach", Guzik Technical Enterprises, ch.4, 1996.

A. Van Herk, "Side Fringing Fields and Write and Read Crosstalk of Narrow Magnetic Recording Heads", IEEE Transactions on Magnetics, vol. Mag-13, No. 4, pp. 1021-1028, Jul. 1977.

A. Van Herk, et al., "Measurement of Side-Write, -Erase, and -Read Behavior of Conventional Narrow Track Disk Heads", IEEE Transactions on Magnetics, vol. Mag-16, No. 1, pp. 114-119, Jan. 1980.

* cited by examiner

Primary Examiner — Dismery Mercedes

(57) ABSTRACT

Methods for measuring media performance associated with adjacent track interference are provided. One such method includes iteratively writing data to a target track for each of a plurality of n frequencies, measuring a first signal amplitude and a first noise for each of the n sectors on the target track, writing an aggressor track pattern proximate the target track, measuring a second signal amplitude and a second noise for each of the n sectors on the target track, calculating a weighted sum for each of the signal amplitude measurements for each of the plurality of n frequencies, and calculating a weighted sum for each of the noise measurements for each of the plurality of n frequencies, and repeating the writing the aggressor track pattern, the measuring the second signal amplitude and the second noise, and calculating the weighted sums for preselected numbers of times.

15 Claims, 5 Drawing Sheets

METHODS FOR MEASURING MEDIA PERFORMANCE ASSOCIATED WITH ADJACENT TRACK INTERFERENCE

FIELD

The present invention relates to magnetic media used in information storage devices, and more specifically to methods for measuring media performance associated with adjacent track interference.

BACKGROUND

Information storage devices commonly include magnetic media in the form of multiple magnetic disks for storing information. The optimization of the magnetic media for such information storage devices is a tradeoff relating to many competing design constraints. In particular, many media parameters improve when the media is made magnetically "softer" resulting in wider written tracks. However, this degrades the performance in the drive when data are written on adjacent tracks and some of the on-track information is degraded because the track is too wide. There are several measurements that assess the impact of writing on adjacent tracks, including, for example, squeeze measurements, adjacent track interference signal to noise ratio (ATI-SNR) measurements, and error rate final measurements. However, these measurement techniques commonly offer little or no insight into how the adjacent track writes are impacting the original data.

SUMMARY

Aspects of the invention relate to methods for measuring media performance associated with adjacent track interference. In one embodiment, the invention relates to a method for measuring performance associated with adjacent track interference on a magnetic disk media for a storage device, the method including iteratively writing data to a target track for each of a plurality of n frequencies, where iteratively writing data for an nth iteration includes writing an nth sector of the target track on the disk with an nth pattern at an nth frequency, measuring a first signal amplitude and a first noise for each of the n sectors on the target track, writing an aggressor track pattern proximate the target track, measuring a second signal amplitude and a second noise for each of the n sectors on the target track, calculating a weighted sum for each of the first and second signal amplitude measurements for each of the plurality of n frequencies, calculating a weighted sum for each of the first and second noise measurements for each of the plurality of n frequencies, repeating the writing the aggressor track pattern proximate the target track for a predetermined number of times to generate cumulative measurements, repeating the measuring the second signal amplitude and the second noise for each of the n sectors on the target track, and repeating the calculating the weighted sum for each of the first and second signal amplitude measurements and the calculating the weighted sum for each of the first and second noise measurements using the cumulative measurements to generate adjacent track interference performance information.

In another embodiment, the invention relates to a method for measuring performance associated with adjacent track interference on a magnetic disk media for a storage device, the method including iteratively measuring a first signal amplitude and a first noise at a target track for each of a plurality of n frequencies, where the iteratively measuring the first signal amplitude and the first noise for an nth iteration includes writing a circumferential target track on the disk with an nth pattern at an nth frequency, measuring a first signal amplitude and a first noise at the target track, and erasing the nth pattern, iteratively measuring a second signal amplitude and a second noise at a target track for each of the plurality of n frequencies, where iteratively measuring the second signal amplitude and the second noise for an nth iteration includes writing a second circumferential target track on the disk with an nth pattern at an nth frequency, writing, repeatedly for a preselected number of times, an aggressor track pattern proximate the second target track, measuring a second signal amplitude and a second noise at the second target track, and erasing the nth pattern, calculating a weighted sum of the first signal amplitude measurements and the second signal amplitude measurements for each of the plurality of n frequencies, calculating a weighted sum of the first noise measurements and the second noise measurements for each of the plurality of n frequencies, and using the calculated weighted sum of the first and the second signal amplitude measurements and the calculated weighted sum of the first and the second noise measurements to generate adjacent track interference performance information.

In yet another embodiment, the invention relates to a method for measuring performance associated with adjacent track interference on a magnetic disk media for a storage device, the method including (a) writing a circumferential target track on the disk with a nth pattern at an nth frequency, (b) measuring a first signal amplitude and a first noise at the target track, (c) writing, repeatedly for a preselected number of times, an aggressor track pattern proximate the target track, (d) measuring a second signal amplitude and a second noise at the target track, (e) erasing the nth pattern, (f) repeating (a)-(e) n times, (g) calculating a weighted sum of the first signal amplitude measurements and the second signal amplitude measurements for each nth frequency, and (h) calculating a weighted sum of the first noise measurements and the second noise measurements for each nth frequency.

Figure 6:
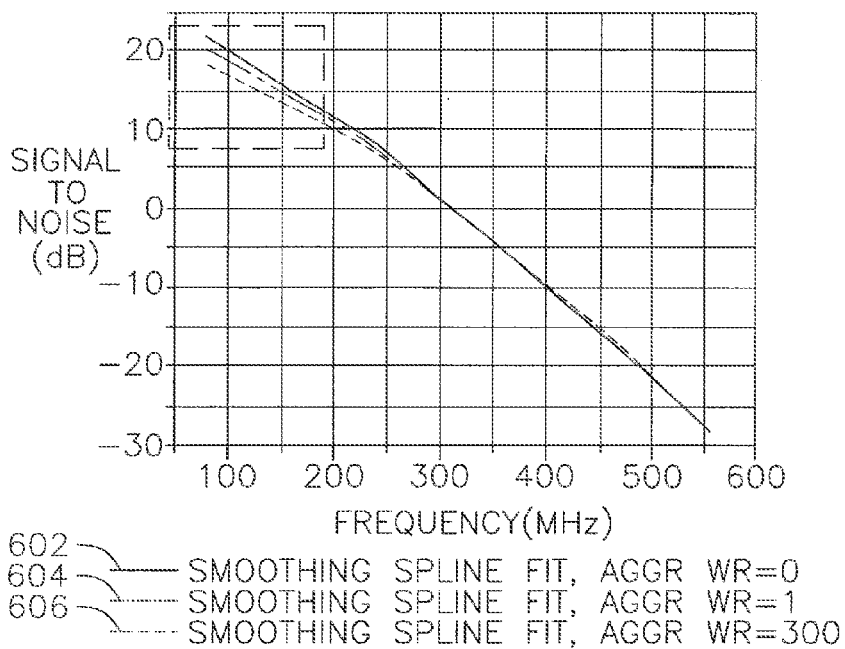

FIG. 6 is a graph of a calculated signal to noise ratio (SNR) versus frequency illustrating media performance for zero aggressive writes, 1 aggressive write, and 300 aggressive writes in accordance with one embodiment of the invention.

Figure 7:
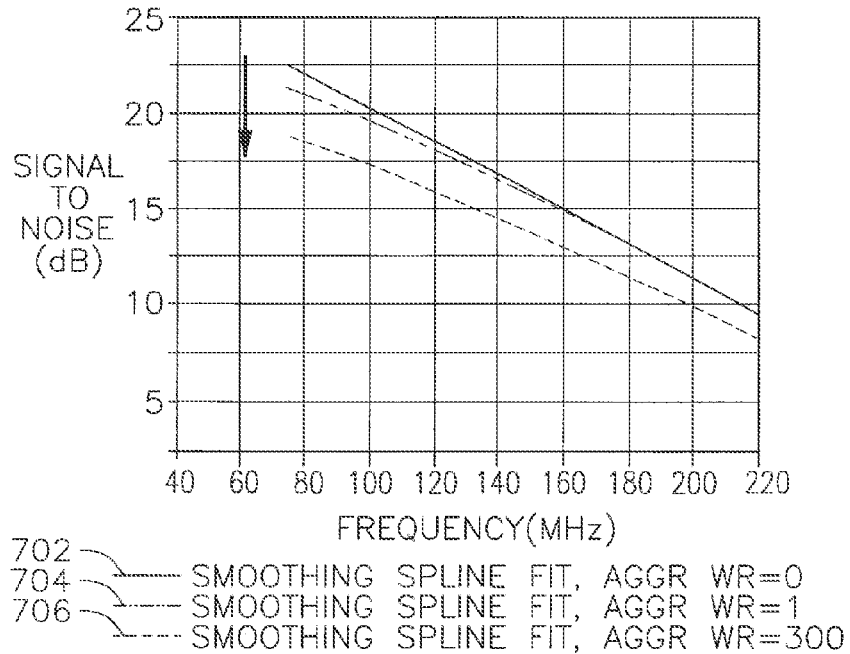

FIG. 7 is an expanded view of a portion of the graph of FIG. 6 illustrating an extent of damage caused by adjacent track interference in accordance with one embodiment of the invention.

DETAILED DESCRIPTION

Referring now to the drawings, embodiments of processes for measuring performance characteristics associated with adjacent track interference on magnetic disk media are illustrated. The processes write data to the magnetic media at a preselected number of frequencies and then make signal and noise measurements before and after one or more adjacent writes proximate to the data (e.g., aggressor write). The processes can write the data and take signal and noise measurements for the preselected number of frequencies. The processes can also repeat the aggressor writes a preselected number of times. The processes then calculate weighted sums of the signal and noise measurements. The calculated information can be used to make improvements in the magnetic media or processes associated with use of the magnetic media.

In some embodiments, the processes write data to a preselected number of circumferential tracks at the preselected frequencies and measure the adjacent track interference associated therewith. In other embodiments, the processes write data to sectors of a single circumferential track at the preselected frequencies and measure the adjacent track interference associated therewith.

Figure 1:
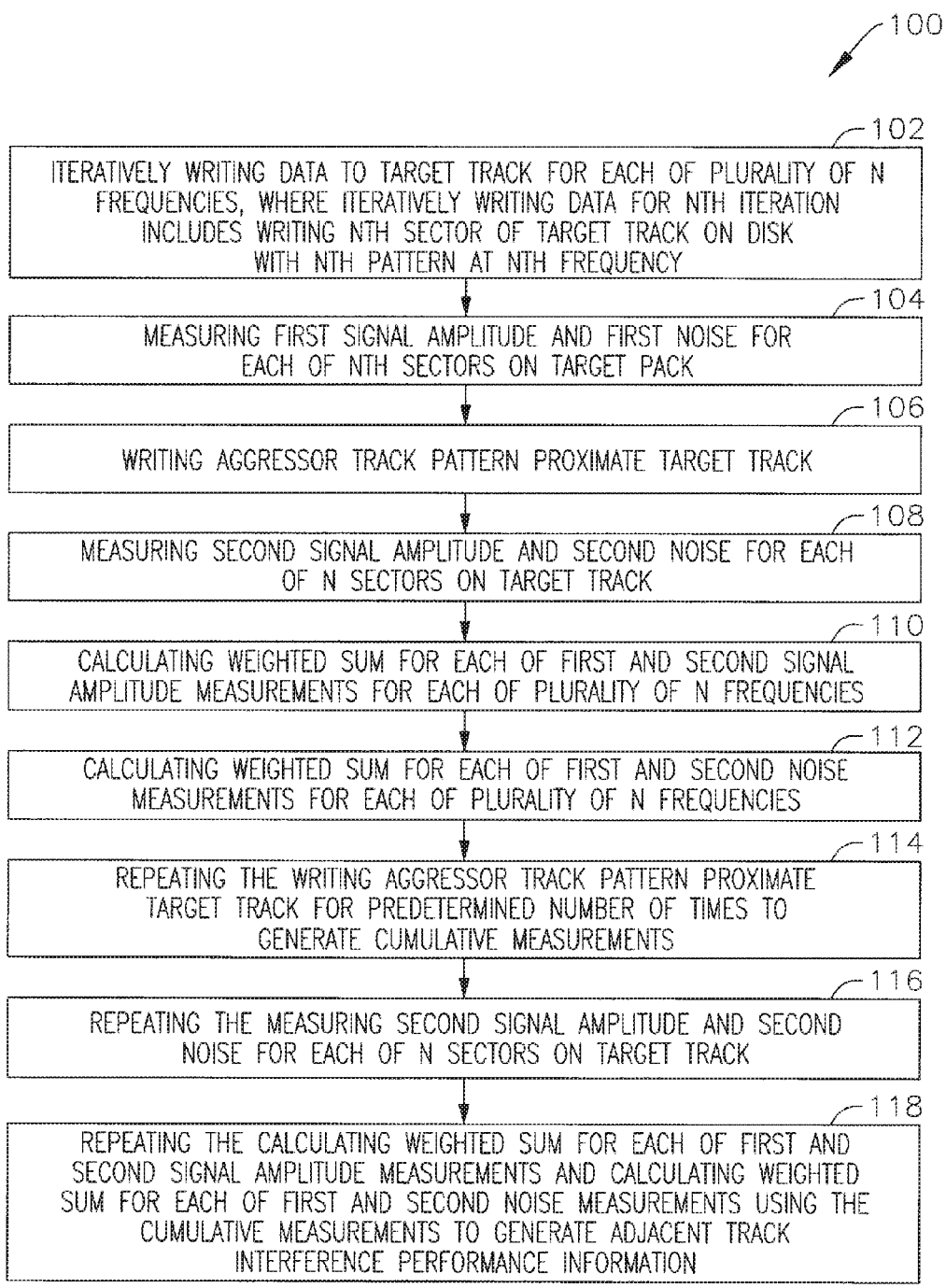
FIG. 1 is a flow chart of a process for measuring performance characteristics associated with adjacent track interference (e.g., by one or more aggressor writes) for a single target track of a magnetic disk media, where the process calculates weighted sums of the performance characteristics at multiple frequencies in accordance with one embodiment of the invention.

FIG. 1 is a flow chart of a process 100 for measuring performance characteristics associated with adjacent track interference (e.g., by one or more aggressor writes) for a single target track of a magnetic disk media, where the process calculates weighted sums of the performance characteristics at multiple frequencies in accordance with one embodiment of the invention. The process begins by iteratively writing (102) data to a target track for each of a plurality of n frequencies, where the iteratively writing data for an nth iteration includes writing an nth sector of the target track on the disk with an nth pattern at an nth frequency. In several embodiments, n is a positive integer indicative of a number of frequencies at which the process writes data. In one embodiment, n is 6. In one embodiment, the process also repeats the iteratively writing to the target track for a preselected number of times with additional sectors until the target track is about full. In one embodiment, the target track includes about 128 sectors. In one embodiment, the preselected number of times for writing with the additional sectors is about 20 or greater than 20.

The process continues by measuring (104) a first signal amplitude and a first noise for each of the n sectors on the target track. The process then writes (106) an aggressor track pattern proximate the target track. In some embodiments, the process writes the aggressor track pattern on one side of the target track. In other embodiments, the process writes the aggressor track pattern on both an inner side and an outer side of the target track. The process then measures (108) a second signal amplitude and a second noise for each of the n sectors on the target track. In one embodiment, the process measures the first and second signal amplitude and the first and second noise at the target track for each sector by measuring the first and second signal amplitude and the first and second noise for each of the sectors written at the nth frequency.

The process then calculates (110) a weighted sum for each of the first and second signal amplitude measurements for each of the plurality of n frequencies. In some embodiments, the number of frequencies is 6. In one such case, the frequencies are multiples of one another. For example, a first frequency is 1 multiplied by a period (T) for the highest frequency for the preselected location of the target track on the disk. In such case, the other frequencies are 2T, 3T, 4T, 5T and 6T, where each of these additional frequencies are lower than the 1T frequency. In one embodiment, the weights for the various weighted sum calculations can be given to the 6 frequencies in accordance with the table listed below.

| Frequency | Weight |
|---|---|
| 1T | 0.25 |
| 2T | 0.25 |
| 3T | 0.1875 |
| 4T | 0.125 |
| 5T | 0.071825 |
| 6T | 0.046875 |

The process then calculates (112) a weighted sum for each of the first and second noise measurements for each of the plurality of n frequencies. In one embodiment, the process applies the weights listed in the table above to the noise measurements for each of 6 frequencies. The process repeats (114) the writing the aggressor track pattern proximate the target track for a predetermined number of times to generate cumulative measurements. In one embodiment, the predetermined number of times is 299 thereby resulting in a total of 300 aggressor writes. The process then repeats (116) the measuring the second signal amplitude and the second noise for each of the n sectors on the target track. In one case, measurements have therefore been made before any aggressor writes, after 1 aggressor write, and after 300 aggressor writes. The process repeats (118) the calculating the weighted sum for each of the first and second signal amplitude measurements and the calculating the weighted sum for each of the first and second noise measurements using the cumulative measurements to generate adjacent track interference performance information. In several embodiments, the process calculates differences in successive signal and noise measurements to generate the adjacent track interference performance information. In some embodiments, the process considers the cumulative measurements and subsequently performs analysis of more specific data measured at particular frequencies during the process for a more comprehensive media performance analysis.

In several embodiments, the adjacent track interference performance information is used to make improvements in the magnetic media or processes associated with use of the magnetic media. In some embodiments, the adjacent track interference performance information can be used to in place of other conventional measurements of error. In several embodiments, the adjacent track interference performance information provides more information than the information provided by conventional error measurement techniques.

In one embodiment, the target track is a circumferential track extending around the disk at a preselected radius. In one embodiment, the target track is about circular.

In one embodiment, the process can perform the sequence of actions in a different order. In another embodiment, the process can skip one or more of the actions. In other embodiments, one or more of the actions are performed simultaneously. In some embodiments, additional actions can be performed.

In some embodiments, the process can be performed using a test assembly for testing magnetic storage drives. In one such embodiment, the test assembly includes a model referred to as a Guzik Spinstand V2002 along with a sub-test assembly model RWA2002 made by Guzik Technical Enterprises of Mountain View, Calif.

Figure 2:
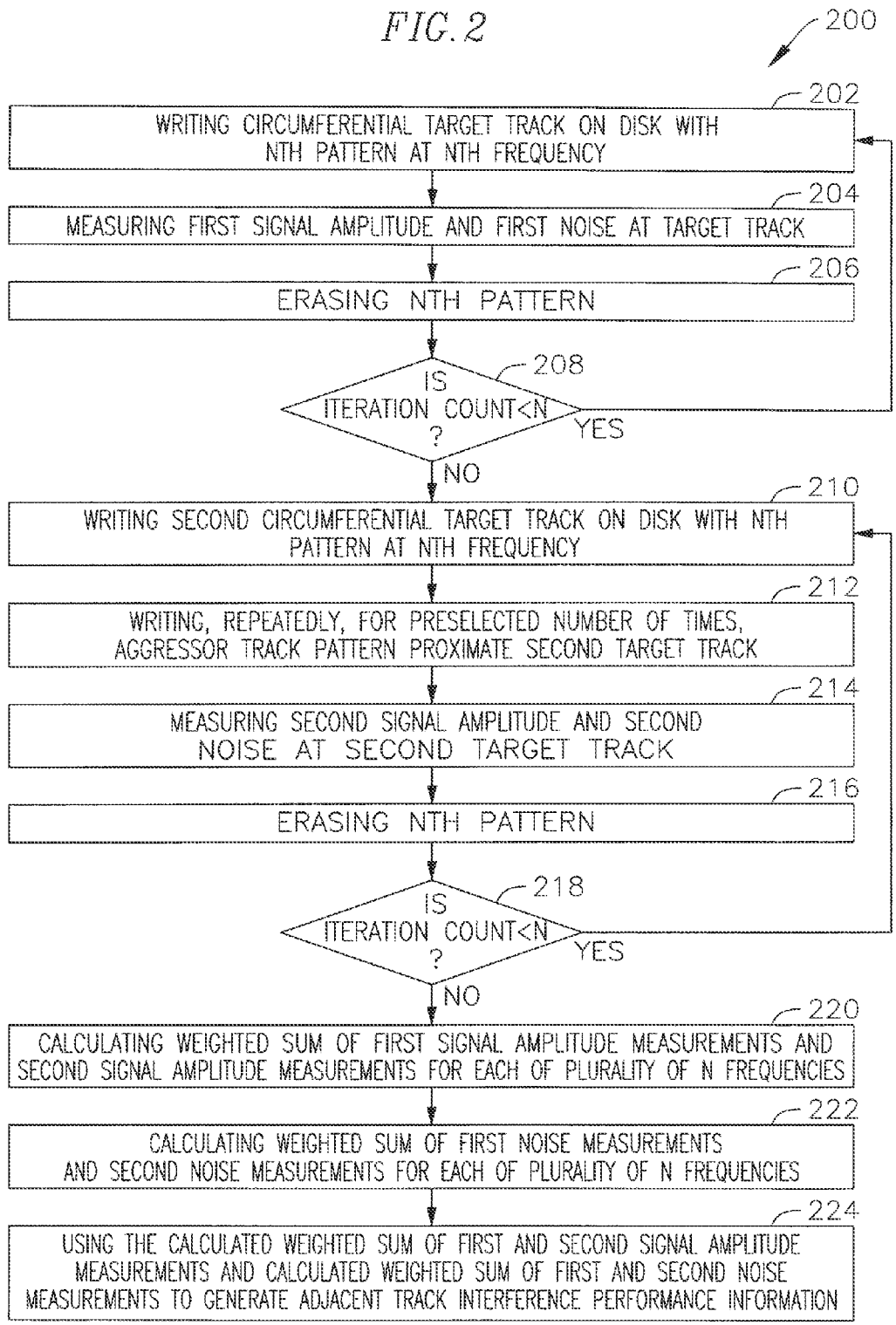
FIG. 2 is a flow chart of a process for measuring performance characteristics associated with adjacent track interference for multiple target tracks of a magnetic disk media, where the process calculates weighted sums of the performance characteristics at multiple frequencies in accordance with one embodiment of the invention.

FIG. 2 is a flow chart of a process 200 for measuring performance characteristics associated with adjacent track interference for multiple target tracks of a magnetic disk media, where the process calculates weighted sums of the performance characteristics at multiple frequencies in accordance with one embodiment of the invention. The process first writes (202) a circumferential target track on the disk with an nth pattern at an nth frequency. In several embodiments, n is a positive integer indicative of a preselected number of frequencies at which the process writes data. In one embodiment, n is 6. In other embodiments, n can be greater than or less than 6. The process then measures (204) a first signal amplitude and a first noise at the target track. The process erases (206) the nth pattern on the target track. The process determines (208) whether the iteration count is less than n. If so, the process returns to block 202 to write another target track at another frequency.

If the process determines that the iteration count is not less than n, the process writes (210) a second circumferential target track on the disk with an nth pattern at an nth frequency. The process then writes (212), repeatedly for a preselected number of times, an aggressor track pattern proximate the second target track. In some embodiments, the process writes the aggressor track pattern on one side of the target track. In other embodiments, the process writes the aggressor track pattern on both an inner side and an outer side of the target track. In one embodiment, the preselected number of times is 1 or 300. The process then measures (214) a second signal amplitude and a second noise at the second target track. The process erases (216) the nth pattern on the second target track. The process determines (218) whether the iteration count is less than n. If so, the process returns to block 210.

In some embodiments, the process repeats the actions of blocks 210-218 with different values for the preselected number of aggressor writes. In one embodiment, for example, the process repeats the actions of blocks 210-218 with the preselected number of aggressor writes equal to 1 and 300. In other embodiments, the process repeats with other suitable values for the preselected number of aggressor writes.

If the process determines that the iteration count is not less than n, the process calculates (220) a weighted sum of the first signal amplitude measurements and the second signal amplitude measurements for each of the plurality of n frequencies. The process then calculates (222) a weighted sum of the first noise measurements and the second noise measurements for each of the plurality of n frequencies. The process uses (224) the calculated weighted sum of the first and the second signal amplitude measurements and the calculated weighted sum of the first and the second noise measurements to generate adjacent track interference performance information.

In several embodiments, the adjacent track interference performance information is used to make improvements in the magnetic media or processes associated with use of the magnetic media. In some embodiments, the adjacent track interference performance information can be used to in place of other conventional measurements of error. In several embodiments, the adjacent track interference performance information can be more accurate other conventional measurements of error.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 3:
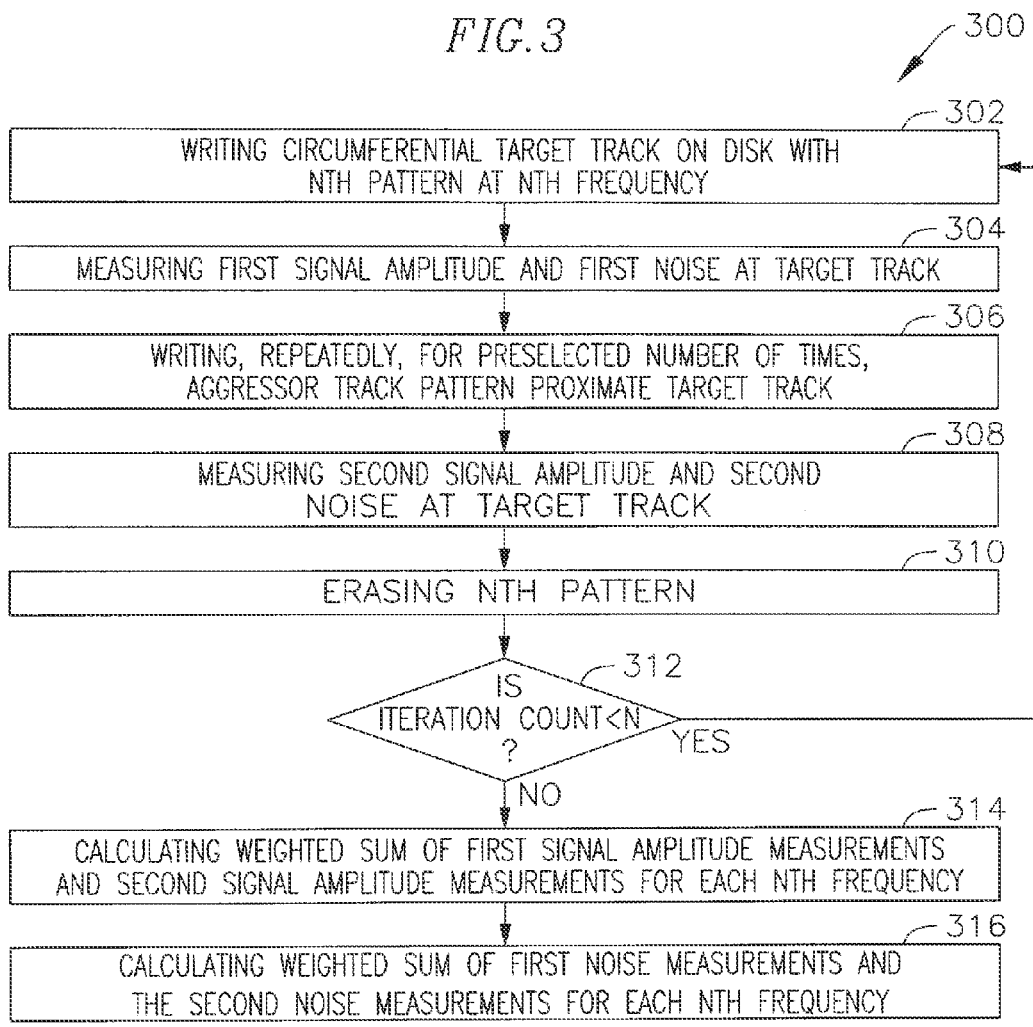
FIG. 3 is a flow chart of a second process for measuring performance characteristics associated with adjacent track interference for multiple target tracks of a magnetic disk media, where the process calculates weighted sums of the performance characteristics at multiple frequencies in accordance with one embodiment of the invention.

FIG. 3 is a flow chart of a second process 300 for measuring performance characteristics associated with adjacent track interference for multiple target tracks of a magnetic disk media, where the process calculates weighted sums of the performance characteristics at multiple frequencies in accordance with one embodiment of the invention. The process first writes (302) a circumferential target track on the disk with a nth pattern at an nth frequency. The process then measures (304) a first signal amplitude and a first noise at the target track. The process writes (306), repeatedly, for a preselected number of times, an aggressor track pattern proximate the target track. In one embodiment, the preselected number of times is 1. In another embodiment, the preselected number of times is 300. In other embodiments, the preselected number of times is another suitable positive integer. In some embodiments, the process writes the aggressor track pattern on one side of the target track. In other embodiments, the process writes the aggressor track pattern on both an inner side and an outer side of the target track.

The process then measures (308) a second signal amplitude and a second noise at the target track. The process erases (310) the nth pattern on the target track. The process then determines (312) whether the iteration count is less than n. If so, the process returns to block 302. If not, the process then calculates (314) a weighted sum of the first signal amplitude measurements and the second signal amplitude measurements for each nth frequency. The process then calculates (316) a weighted sum of the first noise measurements and the second noise measurements for each nth frequency.

In some embodiments, the process is executed with a preselected number of aggressor writes equal to 1 and subsequently with a preselected number of aggressor writes equal to 300. In such case, the process can provide measurement data for 0 aggressor writes, 1 aggressor write, and 300 aggressor writes. In other embodiments, the process can apply other numbers of preselected aggressive writes.

In several embodiments, adjacent track interference performance information is generated using the cumulative data. In such case, the adjacent track interference performance information can be used to make improvements in the magnetic media or processes associated with use of the magnetic media. In some embodiments, the adjacent track interference performance information can be used to in place of other conventional measurements of error. In several embodiments, the adjacent track interference performance information can be more accurate other conventional measurements of error.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
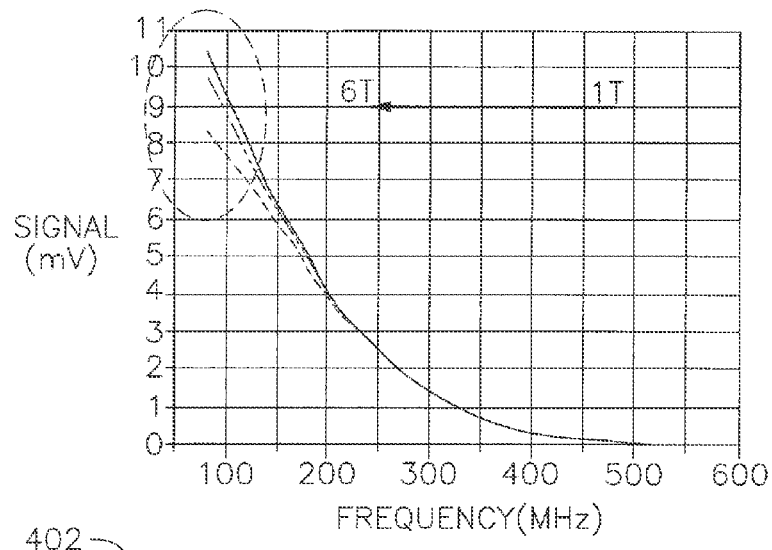
FIG. 4 is a graph of a measured signal magnitude versus frequency illustrating media performance for zero aggressive writes, 1 aggressive write, and 300 aggressive writes in accordance with one embodiment of the invention.

FIG. 4 is a graph 400 of a measured signal magnitude versus frequency illustrating media performance for zero aggressive writes (402), 1 aggressive write (404), and 300 aggressive writes (406) in accordance with one embodiment of the invention.

Figure 5:
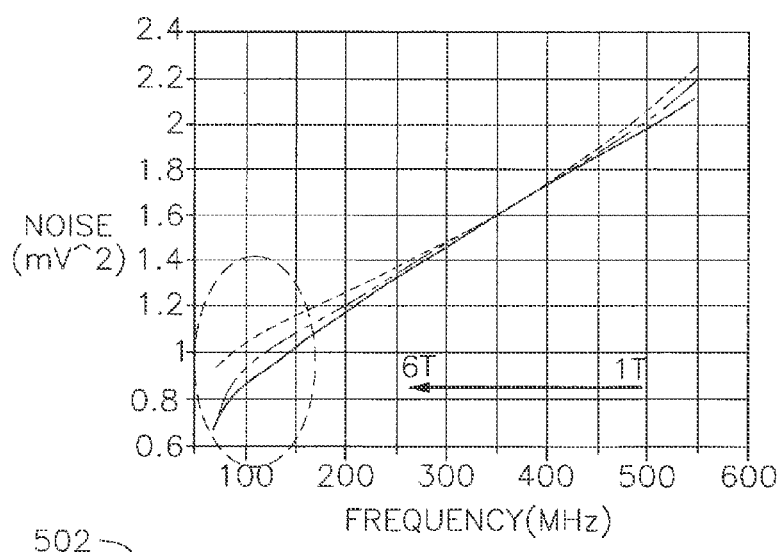
FIG. 5 is a graph of a measured noise versus frequency illustrating media performance for zero aggressive writes, 1 aggressive write, and 300 aggressive writes in accordance with one embodiment of the invention.

FIG. 5 is a graph 500 of a measured noise versus frequency illustrating media performance for zero aggressive writes (502), 1 aggressive write (504), and 300 aggressive writes (406) in accordance with one embodiment of the invention.

FIG. 6 is a graph 600 of a calculated signal to noise ratio (SNR) versus frequency illustrating media performance for zero aggressive writes (602), 1 aggressive write (604), and 300 aggressive writes (606) in accordance with one embodiment of the invention. In several embodiments, the calculated signal to noise ratio for graph 600 is derived from the signal measurements of FIG. 4 and the noise measurements of FIG. 5.

FIG. 7 is an expanded view 700 of a portion of the graph of FIG. 6 illustrating an extent of damage caused by adjacent track interference in accordance with one embodiment of the invention. The decrease in the SNR noted by the downward arrow, represented by the distance from the line indicative of the 0 aggressive writes to the line indicative of the 300 aggressive writes, is representative of the damage caused by adjacent track interference.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for measuring performance associated with adjacent track interference on a magnetic disk media for a storage device, the method comprising:
    iteratively writing data to a target track for each of a plurality of n frequencies, wherein iteratively writing data for an ith iteration comprises writing an nth sector of the target track on the disk with an nth pattern at an nth frequency, wherein the ith is an iteration count extending from 1 to n, wherein n is a positive integer;
    measuring a first signal amplitude and a first noise for each of the n sectors on the target track;
    writing an aggressor track pattern proximate the target track;
    measuring a second signal amplitude and a second noise for each of the n sectors on the target track;
    calculating a weighted sum for each of the first and second signal amplitude measurements for each of the plurality of n frequencies;
    calculating a weighted sum for each of the first and second noise measurements for each of the plurality of n frequencies;
    repeating the writing the aggressor track pattern proximate the target track for a preselected number of times to generate cumulative measurements;
    repeating the measuring the second signal amplitude and the second noise for each of the n sectors on the target track; and
    repeating the calculating the weighted sum for each of the first and second signal amplitude measurements and the calculating the weighted sum for each of the first and second noise measurements using the cumulative measurements to generate adjacent track interference performance information.

2. The method of claim 1, wherein n is 6.

3. The method of claim 1, wherein the preselected number of times is 299.

4. The method of claim 1, wherein n is 6 and the weighted sum of the measured signal amplitude comprises:
    a weight for the first and second signal amplitude measurements of the first frequency of 0.25;
    a weight for the first and second signal amplitude measurements of the second frequency of 0.25;
    a weight for the first and second signal amplitude measurements of the third frequency of 0.1875;
    a weight for the first and second signal amplitude measurements of the fourth frequency of 0.125;
    a weight for the first and second signal amplitude measurements of the fifth frequency of 0.071825; and
    a weight for the first and second signal amplitude measurements of the sixth frequency of 0.046875.

5. The method of claim 1, wherein n is 6 and the weighted sum of the measured noise comprises:
    a weight for the first and second noise measurements of the first frequency of 0.25;
    a weight for the first and second noise measurements of the second frequency of 0.25;
    a weight for the first and second noise measurements of the third frequency of 0.1875;
    a weight for the first and second noise measurements of the fourth frequency of 0.125;
    a weight for the first and second noise measurements of the fifth frequency of 0.071825; and
    a weight for the first and second noise measurements of the sixth frequency of 0.046875.

6. The method of claim 1, further comprising modifying a media structure of the magnetic disk media based the adjacent track interference performance information.

7. The method of claim 1, wherein the target track is a track extending around the disk at a preselected radius.

8. The method of claim 1, wherein the target track is about circular.

9. The method of claim 1, further comprising repeating the iteratively writing to the target track a second preselected number of times with additional sectors along the target track until the target track is about full.

10. The method of claim 9, wherein the measuring the first and second signal amplitude and the first and second noise at the target track for each of the sectors comprises:
    measuring the first and second signal amplitude and the first and second noise for each of the sectors written at the nth frequency.

11. The method of claim 9, wherein the second preselected number of times is greater than 20.

12. The method of claim 1, wherein repeating the calculating the weighted sum for each of the first and second signal amplitude measurements and the calculating the weighted sum for each of the first and second noise measurements using the cumulative measurements to generate adjacent track interference performance information comprises:
    calculating a difference in successive signal amplitude measurements; and
    calculating a difference in successive noise measurements.

13. The method of claim 1, wherein the writing the aggressor track pattern proximate the target track comprises writing the aggressor track pattern proximate the target track on a first side and a second side of the target track.

14. The method of claim 1, wherein each of the plurality of n frequencies are different frequencies.

15. The method of claim 1, wherein each of the plurality of n frequencies are positive integer multiples of each other.

* * * * *